United States Patent [19]

Malmendier et al.

[11] 4,441,905

[45] Apr. 10, 1984

[54] METHOD OF FORMING CERAMIC BODIES

[75] Inventors: Joseph W. Malmendier; Carol F. Pride, both of Big Flats; Randy L. Rhoads, Horseheads; Robert J. Schlaufman, Elmira; Robert D. Shoup, Corning, all of N.Y.

[73] Assignee: Corning Glass Works, Corning, N.Y.

[21] Appl. No.: 461,684

[22] Filed: Jan. 27, 1983

[51] Int. Cl.³ .............................................. C03B 19/10
[52] U.S. Cl. ...................................... 65/21.3; 65/21.4; 65/22; 65/30.13; 65/30.14; 428/404; 428/406; 501/12; 501/33; 501/39; 501/84
[58] Field of Search ...................... 65/21.2, 21.3, 21.4, 65/30.13, 30.14, 22; 501/33, 84, 12, 39; 428/404, 406

[56] References Cited

U.S. PATENT DOCUMENTS

| 2,883,347 | 4/1959 | Fisher et al. | 65/18.4 X |
| 2,978,339 | 4/1962 | Veatch et al. | 65/21.4 |
| 3,161,468 | 12/1964 | Walsh | 423/335 |
| 3,383,172 | 5/1968 | Biegler et al. | 423/335 |
| 3,790,360 | 2/1974 | Kato et al. | 65/30.13 X |
| 3,957,933 | 5/1976 | Egli et al. | 65/21.2 X |
| 4,101,301 | 7/1978 | Rigbi | 65/21.2 |
| 4,239,519 | 12/1980 | Beall et al. | 65/30.14 X |
| 4,336,338 | 6/1982 | Downs et al. | 65/22 X |
| 4,349,456 | 9/1982 | Sowman | 501/12 X |
| 4,380,569 | 4/1983 | Shaw | 428/406 X |

Primary Examiner—Robert L. Lindsay, Jr.
Attorney, Agent, or Firm—C. S. Janes, Jr.

[57] ABSTRACT

A method is disclosed for producing low density, ceramic bodies in the nature of hollow or solid beads which may be used as such or bonded into a unitary mass. The bodies are composed of ion-exchanged, synthetic mica crystals wherein large cations, such as $K^+$, have been exchanged for lithium and/or sodium ions from the mica. The method involves forming a gel by dissolution of a synthetic mica in a polar liquid, releasing droplets of the gel into a fluid to form shaped bodies, effecting the indicated ion exchange, and drying the beads thus formed.

30 Claims, 5 Drawing Figures

METHOD OF FORMING CERAMIC BODIES

BACKGROUND OF THE INVENTION

This invention relates to the formation of ceramic bodies, in the nature of beads, from a gel containing crystals of a synthetic mica. Such beads have low density, may be in the range of 1/16" to ⅜" (1 to 15 mm) diameter and are generally spherical in shape. The term "beads", as used herein unless otherwise indicated, refers to both solid and hollow bodies. The latter are also termed bubbles or microballoons on occasion, whereas beads are sometimes limited to solid bodies.

Low density beads are desirable in a number of applications where lightweight and/or good thermal insulation are desired. These include such insulating applications as ceiling tile and wallboard, such absorbtive applications as medical and agricultural products, and chemical and nuclear processes.

Presently available materials include silica products and organic materials.

PURPOSES OF THE INVENTION

A basic purpose is to produce a new and improved type of ceramic bead, whether hollow or solid, from a synthetic mica gel.

A further purpose is to produce such ceramic body by a continuous process.

Another purpose is to provide a method wherein shaped droplets of a ceramic gel are delivered to an ion exchange medium.

A still further purpose is to provide a method of producing ceramic beads wherein size and density can be controllably varied over substantial ranges.

Another purpose is to produce a bonded structure embodying the ceramic bodies of the invention.

STATEMENT OF INVENTION

To these purposes, and others that will become apparent, our invention is a method of producing low density, ceramic bodies, which may be solid or hollow, from a gel containing dispersed crystals of a synthetic, water-swelling, lithium and/or sodium mica by releasing droplets of the gel to form shaped bodies, effecting an exchange of large cations from an external source with lithium and/or sodium ions from the mica crystals, and draining and drying the ion-exchanged bodies thus formed.

The gel is a sol, preferably aqueous, of a fully or predominantly crystalline body containing crystals of a mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite. The gel may be released from one or more orifices in solid or hollow droplet form, and may be released under pressure and/or under a vibrational influence.

In accordance with one practice, gel droplets are released into a forming fluid which tends to spherodize the droplet. They are then transferred to an ion exchange fluid. Preferably, surface tensions of the two fluids are matched to avoid a strong interfacial tension which might deform a droplet. The ion exchange fluid is preferably a mixture of a potassium chloride solution and a simple alcohol, and the ion exchanged droplets (beads) are preferably placed in a preheated oven while still wet to produce explosive drying.

In one embodiment of this dual fluid treatment practice, the gel, the forming liquid, and the ion exchange medium have densities such that the ion exchange medium is lighter than, and floats on, the forming liquid, the droplets are released in the lower part of the forming liquid, and then float upward through the two liquids. In another embodiment, the forming fluid and the ion exchange medium are again liquids, but their densities are reversed so that the forming liquid floats on the ion exchange liquid, the droplets are released downwardly into the forming liquid, and then sink downwardly through the two liquids. The density of the gel is also adjusted as necessary, depending on the system employed.

The practice of using both a forming fluid and an ion exchange fluid is reasonably necessary to insure spherical formation in solid beads produced in accordance with the invention. It may also be used as a means of producing hollow ceramic beads. However, in that case, it is usually more effective to release the droplets directly into a fluid source of large, ion-exchangeable cations, preferably potassium ions.

RELATED LITERATURE

U.S. Pat. No. 4,239,519 (Beall et al.) describes the production of gels from a synthetic, lithium and/or sodium, water-swelling mica. It further describes producing papers and films from such gels. The method described for gel production comprises three basic steps:

(1) a fully or predominantly crystalline body is formed (commonly a glass-ceramic body) containing crystals consisting essentially of a lithium and/or sodium, water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite;

(2) the body is contacted with a polar liquid, normally water, to cause swelling and disintegration of the body accompanied with the formation of a gel; and (3) the solid liquid ratio of the gel is adjusted to a desired level depending upon the product to be prepared therefrom.

Gels formed in this manner are broken and flocculated by contact with a source of a large exchangeable cation, usually potassium (K+). This causes replacement of lithium and/or sodium ions on the mica platelet surfaces by the larger cations.

U.S. Pat. No. 2,797,201 (Veatch et al.) relates to a method of producing hollow spheres wherein a film-forming material and a gasifying agent are dissolved in a solvent, droplets of the solution are formed, and the droplets subjected to evaporating temperature to form a skin layer of film surrounding a gas bubble from the gasifying agent.

U.S. Pat. Nos. 2,978,339 and -340 (Veatch et al.) disclose forming hollow glass spheres from a synthetic siliceous mixture containing glass components and a gasifying agent. The mixture is heated to fuse the particles and liberate a gas.

U.S. Pat. No. 2,883,347 (Fisher et al.) describes forming silica granules from silica and silica gel, all in powder form. The granules are dried and dropped through a high temperature zone to fuse and spherodize the granules, and release water to form voids.

U.S. Pat. No. 3,161,468 (Walsh) describes forming hollow spheroids of silica by feeding a silica sol into a flame to volatilize the solvent and dehydrate the silica into spheroidal particles.

U.S. Pat. No. 3,383,172 (Biegler et al.) discloses spray drying an aqueous suspension of silicic acid to form hollow silica spheres.

U.S. Pat. No. 4,002,447 (Cone) relates to forming glass beads by jetting molten glass thru an orifice. Bead diameter is varied by using a nozzle with a tapered tip and changing stream velocity by changing pressure or viscosity.

U.S. Pat. No. 4,101,301 (Rigbi) describes forming glass spheres by passing drops of a molten material into a column of molten salts heated in a graduated manner to slowly cool the drop as it descends in the salt.

DESCRIPTION OF THE DRAWINGS

In the accompanying drawings.

GENERAL DESCRIPTION

Figure 2:
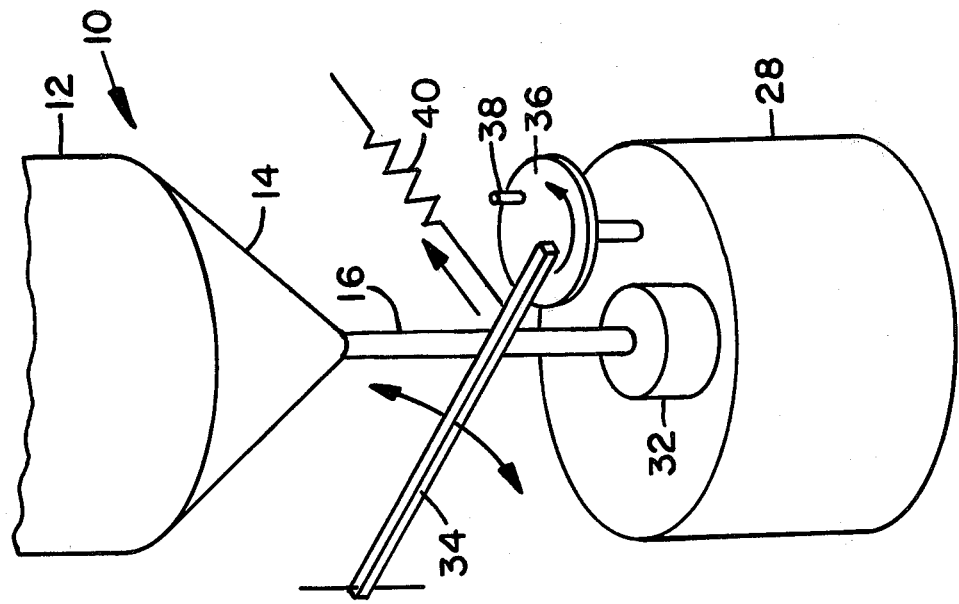
FIG. 2 is a schematic illustration of a modification of the apparatus of FIG. 1.

The gel employed in the inventive method is prepared by disintegrating and dispersing a body of synthetic, lithium and/or sodium, water-swelling mica in a polar liquid such as water. The mica body is a fully or predominantly crystalline body, the crystals consisting essentially of a lithium and/or sodium mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite.

The gel may be prepared from a glass-ceramic, as described in U.S. Pat. No. 4,239,519, from a fusion-cast glass, or from the product of a reaction sintering process, as described in Bulletin 647 (1969) from the Bureau of Mines. It should contain at least 3% solids in order to form satisfactory beads that do not completely deform. A content of 5 to 6% solids enables forming droplets that maintain spherical shape consistently. Gels with solids contents greater than about 5% provide no apparent advantage relative to bulk density.

The invention may be practiced by releasing droplets of the gel into a fluid medium that tends to spheroidize the droplets. The droplets may be released downwardly into the fluid and allowed to sink through the fluid. This practice requires that the gel droplet have a higher density than the fluid.

Alternatively, the droplets may be released upwardly into and through the fluid. In this case, the densities must be reversed. Thus the gel droplet must be lighter than the medium whereby the droplets rise, or float, or are swept upward, through the fluid.

In forming solid bodies by the inventive method, droplets of gel are first released into a fluid referred to as a forming fluid. As the droplet enters and passes through this fluid, it assumes a more or less spherical shape. To this end, the surface tensions of the gel and the fluid must be selected, or adjusted relative to one another, in accordance with colloidal principles.

Once formed, the beadlike droplet must be ion exchanged to flocculate the gel and set the formed droplet. Any large, exchangeable cation may be suitable, but potassium is customarily employed because of its relatively high exchange rate and low cost. The large cation, such as the potassium ion ($K^+$), exchanges with and replaces lithium and/or sodium ions in or on the mica crystals. This alters ion potential and causes flocculation as explained in U.S. Pat. No. 4,239,519.

We prefer to pass the formed droplet directly into a potassium chloride-alcohol solution from the forming fluid. The droplets/beads may then be soaked as long as required for complete ion exchange. This may vary from a matter of minutes to a matter of hours depending on exchange ratio, concentrations, and penetrability of the gel.

The forming liquid is critical both in forming and in maintaining solid bodies, more particularly spherical bodies. As indicated earlier, surface tensions, and consequently fluid viscosities, must be adjusted between the particular gel employed and the forming fluid. Potential bead size tends to increase with the viscosity value of the forming fluid, thus providing a means of varying bead size. We have found that suitable forming fluids can be selected among the water insoluble hydrocarbons and silicone oils for example.

The ion exchange tends to break the gel and flocculate the mica crystals. The net effect then is to stabilize in solid form any body formed from the gel, in this case solid or hollow ceramic beads. Thus, once a droplet is suitably formed, contact with a large exchangeable cation tends to set or stabilize that form. Likewise, as explained later, it is preferred to release hollow droplets directly into an ion exchange fluid to quickly form a tough protective skin by ion exchange.

A wide range of effective exchangeable cations, both inorganic and organic, is known. However, a source of potassium ion, such as a potassium chloride (KCl) solution, is generally preferred because of the reasonably rapid ion exchange rate and the relatively low material cost.

We found, though, that droplets can be severely deformed if the surface tension values of the forming liquid and the ion exchange liquid differ too widely. The variance creates a sharp interfacial tension between the liquids. This, in turn, causes the droplet to deform as it passes through that interface.

Efforts were made to correct the situation by adding a surfactant to reduce interfacial tension. This proved successful, and substantially spherical beads could be produced. However, the surfactant also tended to promote miscibility and to cloud the fluids. Hence another expedient was sought.

We then discovered that an aqueous KCl solution could be successfully employed providing it was diluted with a simple alcohol such as ethanol. Thus, the problem was essentially solved with a mixture of KCl solution and ethanol in approximately equal amounts, the KCl concentration being varied as necessary to provide a desired density.

The beads are customarily allowed to soak in the ion exchange solution as long as necessary to permit completion of the ion exchange. They are then drained and, while still very wet, are quickly transferred to an oven preheated to an elevated temperature which may be about 600° C. It has been observed that, if the beads dry slowly, the bead tends to collapse and bulk density increases. When introduced wet into a preheated oven, the bead "popcorn dries", that is puffs up and essentially bursts open with low resultant density on the order of 3 to 4 lbs./ft.$^3$. The soaked beads may be thoroughly washed and rinsed if salt removal is desired. Alternatively, the salts may remain to provide a bond if desired.

The discussion thus far has centered mainly on solid bodies. However, it will be appreciated that hollow beads may also be formed. Various techniques are known for introducing gas, usually air, into droplets to form bubbles, one such technique being illustrated subsequently.

Ceramic bubbles, also known as microballoons or hollow beads, may be formed by the same two stage fluid contact described for solid bead production. However, a modified procedure, whereby the bubbles are released directly into an ion exchange fluid, is preferred for at least two reasons. It of course simplifies processing by omitting a step. More important however, the presence of an internal pressure in the hollow droplet not only tends to form the body, but also tends to cause bubble collapse unless a tough skin is quickly formed by ion exchange.

The invention is further described with reference to various operations as schematically illustrated in the accompanying drawings.

Figure 1:
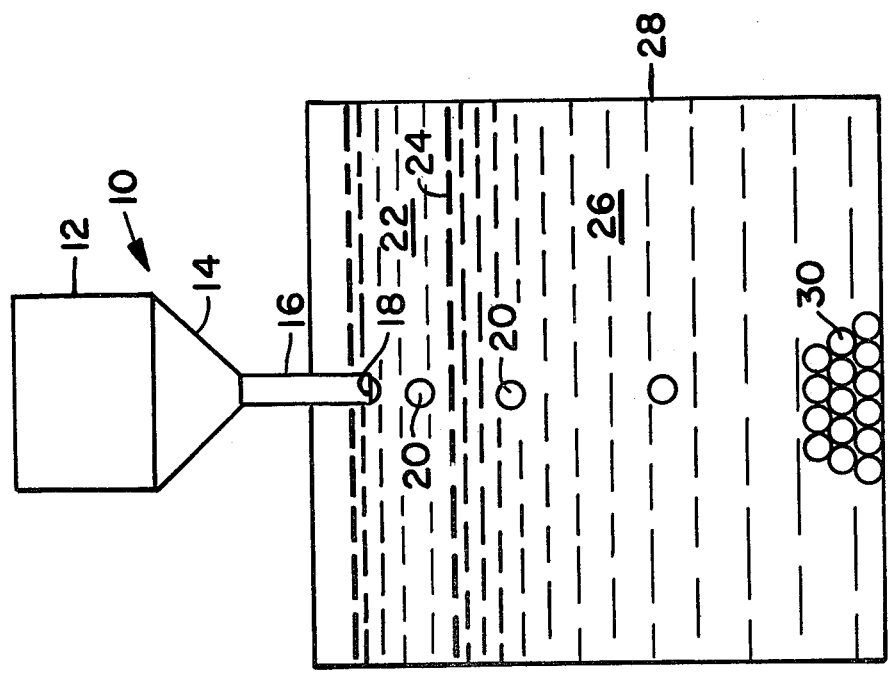
FIG. 1 is a schematic illustration of one means of forming beads in accordance with the invention.

FIG. 1 illustrates schematically a means of forming solid beads by downward release of gel droplets. A quantity of mica-containing gel is placed in a container 10 shown as a cylindrical well 12 having a tapering base 14. The gel flows down an integral delivery tube 16 which terminates in an orifice 18 from which droplets of gel 20 are released. Droplets 20 are released into a forming liquid 22 of suitable viscosity and immiscibility with water to cause the droplets to take a substantially spherical shape. Formed droplets 20 sink through interfacial boundary 24 into ion exchange solution 26. Here they remain for a soak period of sufficient length to effect substantially complete exchange of cations from solution 26 with lithium and/or sodium ions from the mica crystals. Forming liquid 22 and ion exchange liquid 26 are contained in vessel 28. The ion-exchanged droplets (beads) 30 are then removed and drained. When it is desirable to do so, the wet beads may be rinsed to remove excess ion exchange salts. While still wet, the beads are placed in a preheated oven (not shown) for explosive drying.

Droplets 20 may be formed solely by gravity flow of the gel downwardly through an orifice 18. However, it has been observed that the rate of droplet formation changes as the pressure head changes in container 10. This may be corrected by applying pressure to the container through a regulator that maintains constant pressure during operation.

Orifice 18 may be provided by various expedients. For example, we have used copper caps with holes drilled through the cap and the cap sealed to a delivery tube. We have also used ground to desired diameter pipette tips and a hypodermic needle. The different materials affect droplet size. Also varying orifice size from 0.4 to 3.2 mm (1/64 to ⅛ inch) had the effect of varying diameter by as much as 50%. Finally, these factors, combined with selection of forming liquid viscosity, permits varying droplet and bead size from one to 15 mm or more.

FIG. 2 shows schematically a modification of FIG. 1 wherein the effect of a shearing force is added. This provides a means of hastening release of droplets and thereby reducing bead size. In this way, droplet, and hence bead, size may be changed without equipment shutdown or change in orifice or material.

FIG. 2 embodies the elements of FIG. 1, but is a perspective view to better show the shearing action added. Thus, gel is held in a reservoir or container 10 with delivery tube 16 passing thru collar 32 and releasing droplets 20 (not shown) into a forming liquid 22 as in FIG. 1. Forming liquid 22 and ion exchange liquid 26 are contained within vessel 28, also as in FIG. 1.

The shearing action is delivered to droplets 20 as they form at orifice 18. In the apparatus of FIG. 2 it is generated by a tapping arm 34 periodically contacting delivery tube 16. A motor driven disc 36, having pin 38 located adjacent its periphery, contacts tapping arm 34 in an eccentric manner, and moves it away from tube 16 a fixed distance. Tapping arm 34 is then released by pin 38, and vigorously returned against tube 16 by spring 40. This creates a vibration in the tube and consequent shearing action. This cycle is repeated with each revolution of pin 38 on disc 36.

Figure 3:
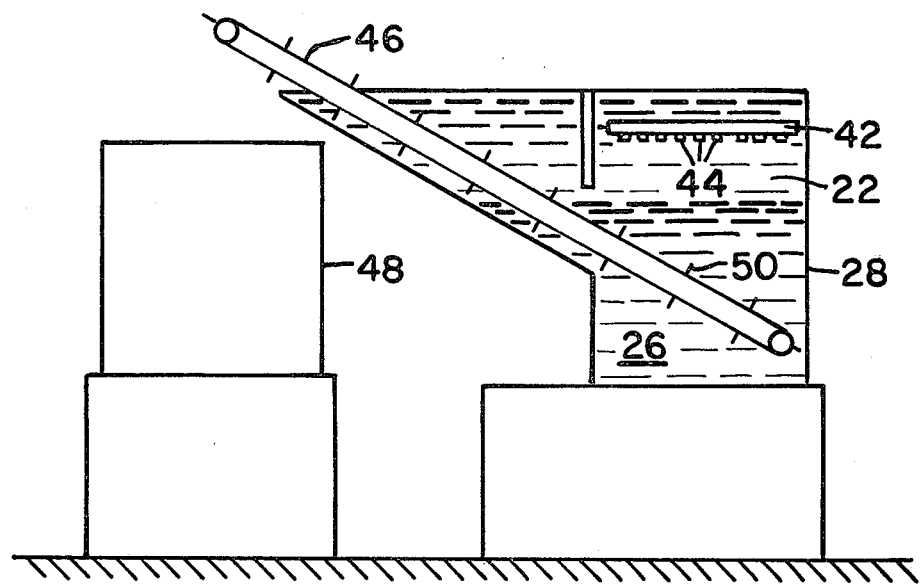
FIG. 3 is a schematic illustration of a scaled up modification of FIG. 1.

FIG. 3 illustrates, again schematically, a larger scale production apparatus which provides for multi-droplet formation and release. In this apparatus, a gel reservoir 42, which may be a square, box-like vessel, is provided on its under surface with a plurality of orifice openings 44 from which gel droplets may be released. In this case, the orifices are uniformly spaced in nine rows of nine orifices each.

Droplets are released into a forming liquid 22 in the manner illustrated in FIG. 1. The droplets pass from forming liquid 22 into ion exchange solution 26. As earlier explained, this is preferably a mixture of KCl solution and ethyl alcohol.

The formed and ion-exchanged droplets may now be considered as beads. The beads are collected on a conveyor belt 46 and transferred to a collector 48. Conveyor belt 46 may be a standard endless belt driven around spaced cylinders and having a plurality of spaced, upstanding stop members 50 which prevent the beads from rolling down the inclined belt. The fully ion exchanged beads may be rinsed and collected wet for further processing. This consists of introduction into an oven or kiln preheated to an elevated temperature which may be 600° C.

Figure 4:
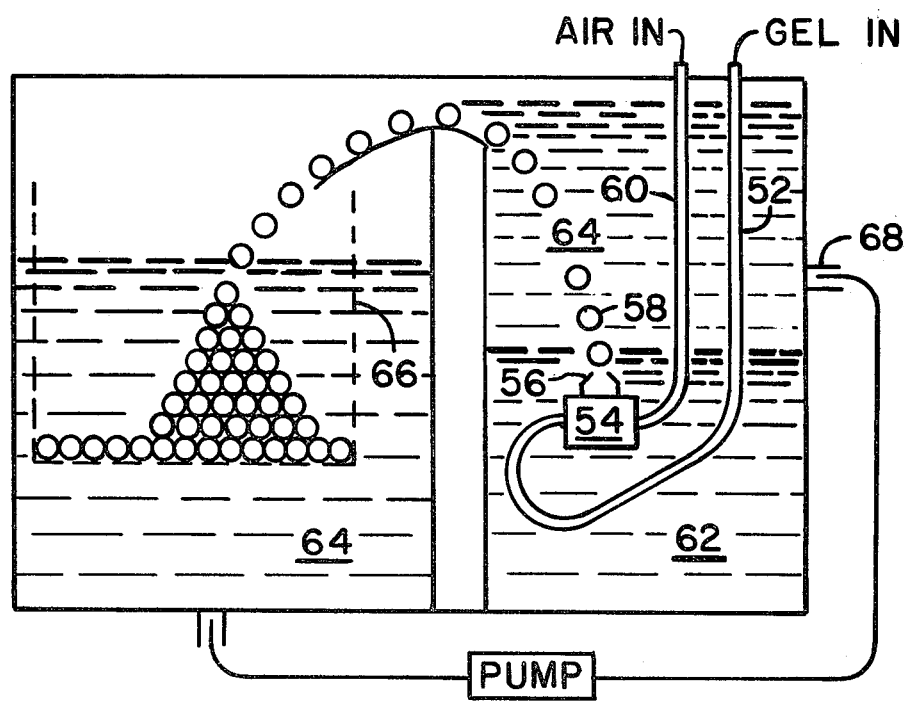
FIG. 4 is a schematic illustration of another means of forming ceramic bodies in accordance with the invention.

FIG. 4 illustrates schematically another method of forming ceramic beads in accordance with the invention. In this case, droplets are expelled upwardly into a forming liquid and float upwardly through that liquid and into an ion exchange liquid.

This system requires that both the forming liquid and the ion exchange liquid must be greater in density than the bubble-forming gel. Likewise, the ion exchange liquid must not only be substantially immiscible with the forming liquid, as before, but must be lower in density. Finally, as illustrated by the arrow at inlet port 68 of the drawing, it is desirable to provide for circulation of the ion exchange liquid. This produces a sweeping action which tends to carry the droplet away from the forming orifice and over into a soaking basket.

In FIG. 4, gel is introduced from a reservoir through tube 52 to a droplet forming chamber 54 having an orifice 56 at which gel droplets 58 form and are expelled under pressure applied through tube 60. Droplets 58 rise through forming liquid 62, pass into ion exchange liquid 64 and ultimately are collected in adjacent container 66 where they soak until exchange is completed. Thereafter, they are drained and dried after being rinsed if desired.

Figure 5:
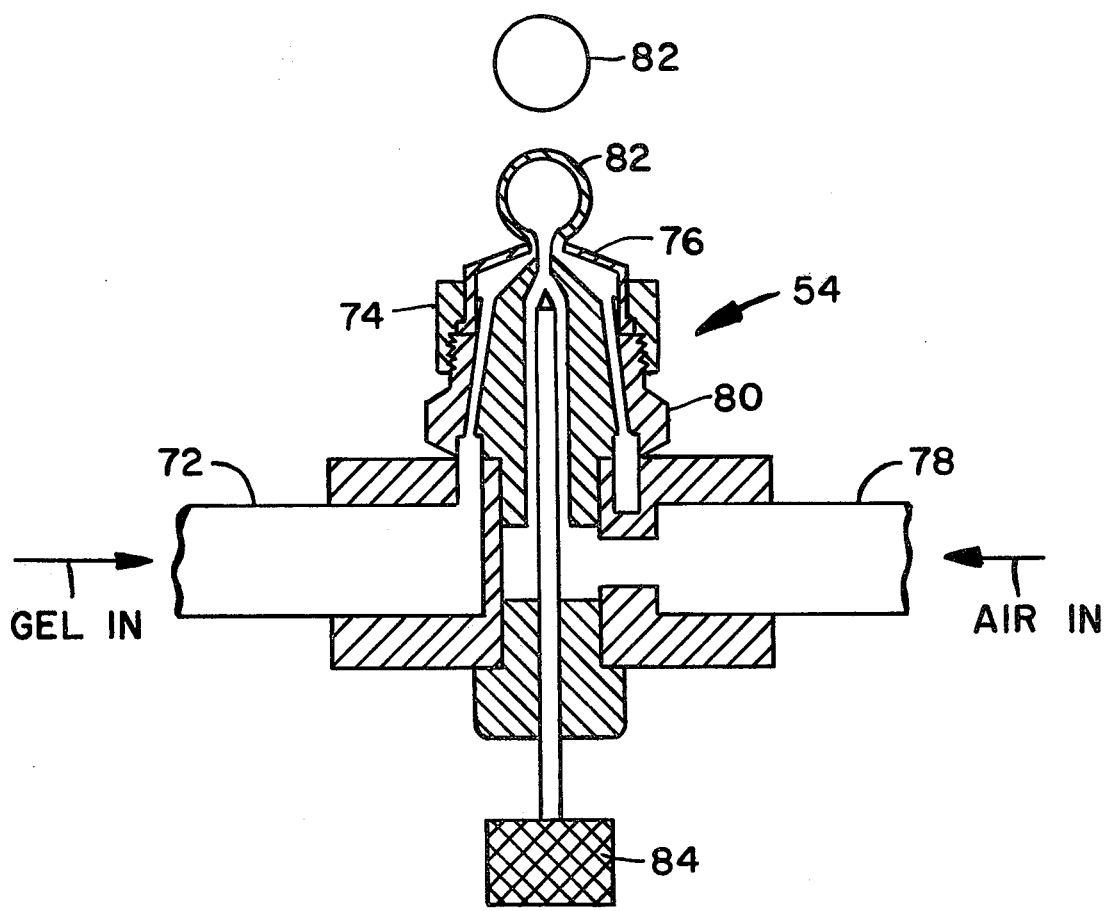
FIG. 5 illustrates in cross-section an orifice adapted for use in the apparatus of FIG. 4.

Droplet forming chamber 54 is schematically illustrated in some detail in FIG. 5. Depending on how the chamber is used, it may form either hollow or solid droplets.

Chamber 54 receives gel under pressure from inlet 72, the gel being conducted through annular channel 74 to orifice outlet 76. It also receives air which enters through inlet 78, passes up annular channel 80 to outlet 76, and may be adjusted by means of needle valve 84. When the gel and air pressures are properly coordinated with each other, and with the outlet opening, hollow droplets of gel 82 form at, and are released from, outlet 76 directly into ion exchange liquid 64. As explained earlier, a forming liquid may be employed as illustrated in FIG. 4. However, for hollow body production, this is not required. The internal air pressure obviates such need. Rather, prompt ion exchange to produce a tough skin may be more significant.

It will be appreciated that chamber 54 may be employed to form solid droplets, and thence beads, as well. In this case, air pressure through inlet 78 may be shut down completely, or may be controlled by needle valve 84 to assist in separating a solid droplet from the orifice.

One particular area of interest for the product of the invention is board structures as used in thermal insulation. To this end, it is desirable, if not necessary, to bond the low density bodies together by some sort of cementing matrix.

One approach is to coat the beads with a salt that will vitrify after firing to provide at least point bonding. Where this is done, it may be desirable to leave an ion exchange salt coating on the bodies. In other words, the bodies would be drained without any washing or rinsing step.

The bonding may be provided by the same gel as used in producing the bodies. Thus, it may be a diluted gel applied directly. Alternatively, it may be a frothed gel having a cation exchange source incorporated therein. Such frothed materials are disclosed in companion application Ser. No. 461,670, filed Jan. 27, 1983, entitled "Cellular Ceramic Body and Method" and filed in the names of J. E. Flannery, R. D. Shoup and D. R. Wexell. This application is incorporated by reference.

Bonded bead composites have been prepared, as described above, with densities ranging from about four up to ten lbs./ft.$^3$.

SPECIFIC DESCRIPTION

A lithium fluorhectorite gel was prepared from a glass-ceramic material in accordance with teaching in U.S. Pat. No. 4,239,519. The glass-ceramic had the following calculated composition in weight percent on an oxide basis: 64.5% $SiO_2$, 10.8% $MgO$, 8.0% $Li_2O$, and 16.7% $MgF_2$. It was prepared by melting a glass batch, and crystallizing the resulting glass to a glass-ceramic. The glass-ceramic, containing crystals of lithium fluorhectorite, was introduced into water in such amounts as to produce a gel containing 5% solids. The glass-ceramic became swollen in the water and disintegrated into thin, minute platelets that formed the desired aqueous gel.

The gel thus formed was placed in a cylindrical vessel such as vessel 10 having an outlet in its base connected to a delivery tube 16 provided with a droplet forming orifice 18 in its tip. The orifice was immersed in a forming fluid, in this case a silicone oil having a 5 cs viscosity and available from Dow Corning Corporation, Midland, Michigan as #200 fluid. The forming fluid covered to a depth of about one inch an ion exchange solution composed 1:1 on a weight basis of 0.67 molar KCl (50 grams/liter) and ethyl alcohol.

As droplets passed through the forming fluid and ion exchange solution, they were converted to solid beads. These were soaked in the ion exchange solution for at least an hour, then rinsed and introduced wet into a drying kiln preheated to 600° C.

In order to study the effect of orifice size on bead formation, six different orifices, graduated in diameter from 0.4 mm to 3.2 mm, were produced by inserting a drill of each diameter in a glass pipette and grinding the pipette tips until the drills just passed through. Beads were produced using each orifice. Each batch of beads was sampled and average bead diameter in millimeters (B.D. mm) and bulk density in kilograms per cubic meter (Den. Kg/m$^3$) measured. The results for the inner diameter of each orifice (I.D. mm) are shown in TABLE I:

TABLE I

| I.D. mm | B.D. mm | Den Kg/m$^3$ |
|---|---|---|
| 0.4 | 6.3 | 49 |
| 0.8 | 7.1 | 45 |
| 1.6 | 7.6 | 39 |
| 2.4 | 8.3 | 45 |
| 3.2 | 9.2 | 40 |
| 3.2 | 9.0 | 42 |

Thus, bead diameter can be varied considerably in this manner with but minor effect on density.

In order to determine the variability permitted in forming liquid and ion exchange solution, changes in materials and proportions were tested. Thus, solid beads were formed using a 1.6 mm ground pipette orifice and substituting an acrylic lacquer thinner for the silicone oil as a forming fluid. The thinner had a lower viscosity of about 14 cps. The beads formed were less well shaped, smaller, and lacking in size uniformity. The lower viscosity fluid could not support as large a gel droplet as the more viscous oil. For example, bead diameter varied from 1 to 4 mm with less than 1% being over 3.3 mm. Bulk density was 81 Kg/m$^3$.

Beads were also formed in air before dropping through the KCl-ethanol, ion exchange solution. Again these were smaller, average diameter being 2.5 mm and bulk density being 60.5 kg/m$^3$.

The literature, such as U.S. Pat. No. 4,239,519 and the Bureau of Mines Bulletin mentioned earlier, discloses use of ion exchange to stabilize lithium and/or sodium ion fluormicas and bodies produced therefrom. Customarily potassium chloride (KCl) solutions are employed. In the present work, it was observed that spherical droplets, formed in the silicone oil, were seriously deformed as they settled through the interface between the silicone oil and a KCl ion exchange solution. This appeared to be the result of interfacial tension stemming from different surface tensions in the liquids. Additions of ethyl alcohol to the KCl solution were made in an effort to alleviate the condition.

It would be desirable to limit the alcohol addition as much as practical because of cost. However, it was found necessary to use at least 40% alcohol, and a 50% mixture was employed to avoid deformation. On the other hand, another gel material having lithium partially replaced by sodium performed better with higher salt concentrations. Thus, empirical selection must be employed with any particular combination of gel, forming liquid, and ion exchange liquid. An essential condition is to match surface tensions as closely as practical, thus reducing the interfacial tension.

In this experiment, an acrylic lacquer thinner was employed as the forming liquid. The ion exchange liquid was a 1:1 mixture of ethanol and KCl solution. The KCl solution was relatively weak, having 25 grams KCl per liter of solution. The surface tension of the thinner was about 20 dynes/cm, while that of the ion exchange solution was about 22 dynes/cm. This match appeared close enough to permit good bead formation.

In order to compare densities for use in determining procedures and settling rates, additional KCl solutions of 50 grams/liter and 75 grams/liter were made up and mixed with ethanol.

| Liquid | Density |
| --- | --- |
| Thinner | 0.852 g/ml |
| KCl-ethanol | |
| 25 g/l KCl | 0.914 g/ml |
| 50 g/l KCl | 0.939 g/ml |
| 75 g/l KCl | 0.956 g/ml |
| Gel (5% solids) | 1.024 g/ml |

Solid beads were formed with each of the 1:1 KCl-ethanol solutions. The beads were soaked to complete ion exchange, then rinsed, drained, and placed in a preheated oven at 800° C. and dried for one hour. The beads were then removed and bulk density determined. Beads from the weak KCl solution (25 g/l) had a bulk density of 3.8 lbs/ft$^3$; from the medium (50 g/l) 4.9 lbs/ft$^3$; and from the saturated (75 g/l) 5.0 lbs/ft$^3$.

In an apparatus such as shown in FIG. 4, beads were formed by floating gel droplets upward. Trichloroethane, density of 1.4 g/ml, was employed as a forming liquid, and a saturated KCl solution, density 1.17 g/ml, as the ion exchange solution. After drying, the beads thus formed had a bulk density of 5.4 lbs/ft$^3$.

A number of composite structures was produced to demonstrate feasibility of using the present ceramic beads in such composites. The beads were produced from a lithium fluorhectorite gel as described above. Selected examples follow:

EXAMPLE 1

¼" diameter solid beads were packed into a 12" long by 3" diameter glass tube. Two percent solids lithium fluorhectorite gel was poured onto the bead bed and suctioned off. Then a 1 molar KCl solution was poured over the beads and suctioned off. This was then washed, after standing for about an hour, with several distilled water rinses. The body was allowed to dry in a forced air oven at about 50° C. for several hours.

Thermal conductivity of the above weakly bonded but coherent bead structure was measured to be 0.58 BTU in/ft$^2$ hr °F. at room temperature. This compares to 0.47 BTU in/ft$^2$ hr °F. for a packed bead bed of the same volume, but which was not bonded by any cement-type material.

EXAMPLE 2

Solid beads were placed in a 3" diameter Buchner funnel to the depth of about an inch with filter paper in place.

A frothed gel was prepared by placing 200 grams of 10% solids lithium fluorhectorite in a blender, and, while blending, 2.5 grams surfactant and 1.5 grams polyethylene oxide were added. After maximum expansion of the froth occurred, just enough froth was poured over the beads to infiltrate the void space between the beads. This was accomplished by drawing a vacuum on the bed to draw the froth into the bed. Then KCl (1 molar) solution was poured over the sample to cause exchange and bonding of the bead bed. Alternatively, the beads have been soaked with the KCl solution before infiltration of the froth, so that diffusion of the K$^+$ from the surface of the beads could cause similar exchange and bonding.

Densities of about 12 to 14 lbs/ft$^3$ were obtained by this approach, but lower densities appear to be possible with more open cell froths. Densities of 12 lbs/ft$^3$ tend to give higher K values of the order of 1.4 BTU in/ft$^2$ hr °F. at room temperature, but the structures are very strong.

EXAMPLE 3

In a process similar to that described above, a froth was infiltrated into a porous bead bed, but instead the funnel contained no filter paper covering the holes. Thus, when the vacuum was applied, most of the froth in the pores was removed from the bed leaving a film of froth on the beads and at point contacts between the beads. After exchange by either approach, a rather strongly bonded bead structure was obtained which had a density of 10 lb/ft$^3$.

EXAMPLE 4

Solid beads coated with certain salts will adhere at contact points upon firing if the salt becomes a glass. The salt can be applied in a number of ways. The easiest process is to not rinse residual salts from the bead after ion exchange and fire the unrinsed beads. This has been done using K-borate exchange salts. The beads can also be well rinsed and while still wet sugared with the powdered salt and then fired. Using either method, the beads become attached at their contact points.

We claim:

1. A method of producing low density ceramic bodies from a gel containing dispersed crystals from a synthetic, water-swelling, lithium and/or sodium mica, the crystals being selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite, which comprises releasing droplets of the gel to form shaped bodies, effecting an exchange of large cations from an external source with lithium and/or sodium ions from the mica crystals, and draining and drying the ion-exchanged bodies thus formed.

2. A method according to claim 1 wherein the released droplets are hollow, are filled with gas, and form ceramic hollow beads.

3. A method according to claim 2 wherein the hollow droplets are released directly into an ion exchange fluid to effect the cation exchange and form a tough skin on the droplet.

4. A method according to claim 1 wherein the mica crystals are lithium fluorhectorite.

5. A method according to claim 1 wherein potassium ions are the large cations exchanged for sodium and/or lithium ions.

6. A method according to claim 5 wherein the potassium ions are derived from a potassium chloride solution.

7. A method according to claim 1 wherein the crystal-containing gel contains 3–6% solids.

8. A method according to claim 7 wherein the crystal-containing gel contains about 5% solids.

9. A method according to claim 1 wherein the droplets are released under a substantially constant pressure.

10. A method according to claim 1 wherein the droplets are released from an orifice and a shear force is applied to aid in the droplet release and size control.

11. A method according to claim 1 wherein droplets are released from a plurality of orifices.

12. A method according to claim 1 wherein the released droplets are solid, are generally spherical in shape, and form ceramic solid beads.

13. A method according to claim 12 wherein the droplets are released into a forming fluid and then transferred across an interfacial boundary into an immiscible ion exchange liquid to effect the cation exchange in the mica crystals.

14. A method according to claim 13 wherein bead deformation is minimized by matching the surface tensions of the forming liquid and the immiscible ion exchange liquid to minimize interfacial tension at the interfacial boundary between the two liquids.

15. A method according to claim 13 wherein the ion-exchanged beads are drained and, while still wet, placed in a preheated drying oven.

16. A method according to claim 15 wherein the ion-exchanged beads are washed and rinsed before draining and drying.

17. A method according to claim 15 wherein the wet beads are explosively dried to form enlarged porous bodies.

18. A method according to claim 13 wherein the forming liquid is a silicone oil.

19. A method according to claim 13 wherein the ion exchanging liquid is a mixture of potassium chloride solution and ethyl alcohol.

20. A method according to claim 19 wherein the ratio of potassium chloride solution and ethyl alcohol is 1:1.

21. A method according to claim 12 wherein the droplets are released under substantially constant pressure.

22. A method according to claim 12 wherein the droplets are released from an orifice and a shear force is applied to aid in droplet release and size control.

23. A method according to claim 1 wherein potassium ions are the large cations exchanged for sodium and/or lithium ions.

24. A method according to claim 5 wherein the potassium ions are derived from a potassium chloride solution.

25. A method according to claim 13 wherein the forming fluid and immiscible ion exchange medium are liquids having densities such that the ion exchange medium floats on the forming liquid, the droplets are released in the lower part of the forming liquid, and they float upward through the two liquids.

26. A method according to claim 13 wherein the forming fluid and the immiscible ion exchange fluid are liquids having densities such that the forming liquid floats on the ion exchange medium, the droplets are released downwardly into the forming liquid, and then float downwardly through the two liquids.

27. A method of forming low density, ceramic beads from a gel containing dispersed therein crystals of a synthetic, water-swelling, lithium and/or sodium mica, the crystals being selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite, releasing droplets of the gel into a forming fluid, transferring the formed droplets across an interfacial boundary into an ion exchange fluid wherein large cations are exchanged for lithium and/or sodium ions from the mica crystals, and draining and drying the ion-exchanged, mica-crystal-containing bodies thus formed.

28. The method of claim 27 wherein the ceramic beads are bonded together by an intermediate ion-exchanged gel.

29. The method of claim 28 wherein the bonding material is a frothed gel.

30. The method according to claim 27 wherein a salt layer is provided on the beads and they are fired to bond the beads at contact points.

* * * * *